3,349,098
METHINE COMPOUNDS CONTAINING THE CYANOMETHYLIDENE GROUP
James M. Straley, David J. Wallace, and Max A. Weaver, Kingsport, Tenn., assignors to Eastman Kodak Company, Rochester, N.Y., a corporation of New Jersey
No Drawing. Filed June 18, 1965, Ser. No. 465,208
16 Claims. (Cl. 260—326)

This application is a continuation-in-part of Straley et al. U.S. application Ser. No. 252,283, filed Jan. 18, 1963, and now abandoned.

This invention relates to novel compounds containing a dicarboximido radical, and more particularly to methine compounds, containing a dicarboximido radical useful as dyestuffs for textile fibers, yarns and fabrics. Particular methine compounds containing this radical are obtained by condensing nitriles containing an active methylene group with aromatic aldehydes containing the dicarboximido radical.

The methine compounds of the invention have the general formula

I 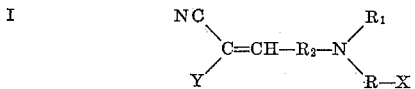

wherein
R=an alkylene group straight or branch-chained, particularly lower alkylene, such as —($CH_2$)$_n$— wherein $n$ is a positive integer from 1 to 4;
$R_1$=a hydrogen atom or an unsubstituted lower alkyl group such as straight and branch-chained lower alkyl groups e.g., methyl, ethyl, propyl, isopropyl, butyl, isobutyl; and substituted lower alkyl such as hydroxyalkyl, e.g. hydroxyethyl; polyhydroxyalkyl, e.g. glyceryl

[—CH(OH)CH(OH)CH$_2$OH]

alkoxyalkyl, e.g. methoxyethyl; cyanoalkyl, e.g. cyanoethyl; cyanoalkoxyalkyl, e.g. β-cyanoethoxyethyl; carboxylic acid, acyloxyalkyl, e.g. acetoxyethyl; carboalkoxyalkyl, e.g. carbethoxyethyl; halogenoalkyl, e.g. chloroethyl; hydroxyhalogenoalkyl, e.g. β-hydroxy-γ-chloropropyl; alkylsulfonylalkyl, e.g. methylsulfonylethyl;

alkyl-OCOOCH$_2$CH$_2$— e.g. CH$_3$OCOOCH$_2$CH$_2$—; carbamoylalkyl, e.g. carbamoylethyl, benzyl, phenoxyalkyl, e.g. β-phenoxyethyl; cyanoalkyl, e.g. β-cyanoethyl; alkylsulfonamidoalkyl, e.g. methylsulfonamidoethyl; alkylcarbonamidoalkyl, e.g. ethylcarbonamidoethyl; dicarboxamidoalkyl, e.g. β-dicarboxamidoethyl, etc.
$R_2$=a monocyclic carbocyclic group of the benzene series including p-phenylene and substituted p-phenylene groups, such as -m-CH$_3$C$_6$H$_3$—; i.e. m-tolylene

wherein the CH$_3$ group is in the position meta to the nitrogen atom of the above formula, -o-CH$_3$C$_6$H$_3$—, -o-ClC$_6$H$_3$—, -2,5-di-(OCH$_3$)C$_6$H$_2$—, -2,5-di-ClC$_6$H$_2$—, -o-OCH$_3$C$_6$H$_3$— and other phenylene groups described below;

X=a dicarboximido group such as phthalimido, succinimido, maleimido, citraconimido, etc., as indicated in the examples below, derived from the corresponding anhydride;
Y=either —CN, a carbamoyl group such as —CONH$_2$ and —CONCH$_3$, a carbalkoxy group, particularly a lower carbalkoxy group, such as —COOCH$_3$ and —COOC$_3$H$_7$, or a cyanocarbalkoxy group, particularly a lower cyanocarbalkoxy group, such as —COOC$_2$H$_4$CN.

The methine compounds of the invention are prepared by condensing nitriles containing an active methylene group such as malononitrile, isopropyl cyanoacetate and β-cyanoethyl cyanoacetate, with dicarboxamidoalkylamino benzaldehydes according to the following reaction:

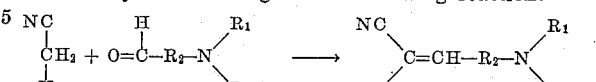

wherein R, $R_1$, $R_2$, X and Y have the same meaning as given above.

A typical methine compound thus obtainable has the structure shown in Example 3.

The dicarboximido radical X of the above compounds has the following general formula

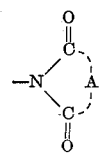

wherein
A represents the atoms necessary to complete a ring containing 4 or 5 carbon atoms in addition to the nitrogen atom, i.e., the hydrocarbon residue of the dicarboxylic acid anhydride from which the radical is derived, including substituted and unsubstituted alkylene, vinylene and ortho-phenylene groups such as —CH$_2$CH$_2$— in the succinimido radical

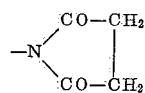

The following are typical dicarboximido groups represented by X in the above formulas derived by reaction of the corresponding dicarboxylic acid anhydrides with N-aminoalkylanilines:

succinimido
phthalimido
tetrachloro phthalimido
tetrahydro phthalimido
hexahydro phthalimido
4-carboxy phthalimido
3-nitro phthalimido
3-methyl phthalimido
3-amino phthalimido
glutarimido
bicyclo[2.2.1]-5-heptene-2,3-dicarboximido

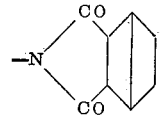

1,8-naphthalimido
citraconimido
cycloalkanedicarboximido e.g.

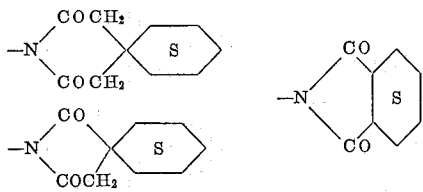

alkyl succinimido e.g.

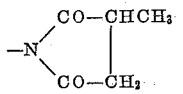

alkenyl succinimido e.g.

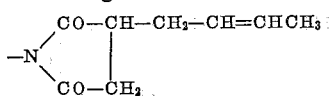

campherimido

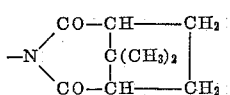

9,10-dihydroanthracene, 9,10-endo succinimido

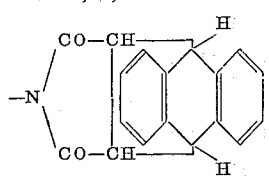

It will be apparent that the color of the methine compounds

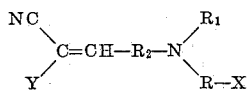

of the invention is due to the presence of the conjugated system such as

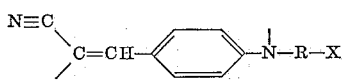

which is capable of resonance. The benzene nucleus $R_2$ can be substituted with a variety of groups, given in detail below, behaving as auxochromes or if these groups contain conjugation can be expected to favorably influence the ease of resonance. Similarly, the dicarboximido ring X per se through lack of conjugation primarily functions as an auxochrome group to control the tinctorial value of the compounds and to some extent the substantivity of the compounds for textile materials. However, the presence of substituents on the dicarboximido ring capable of resonance per se can be expected to favorably influence resonance. Accordingly, the substituents attached the carbon chain A of the dicarboximido nucleus

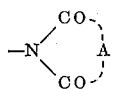

are not critical particularly when the compounds are to be used as textile dyes, with the exception that water-solubilizing groups such as carboxyl and sulfo should be avoided in any case where water-susceptibility is imparted to the compounds. Thus, the substituents attached to the chain of A comprise alkyl, carboxy, nitro, amino, alkyl and alkenyl in the succinimido series. The substituents of A also comprise saturated and unsaturated carbocyclic rings in the series such as the phthalimido, naphthalimido and campherimido series, and can be expected not to have an adverse effect upon the properties of the compounds when they are used as disperse textile dyes. The methine compounds containing the lower molecular weight dicarboximido groups can be expected to be more readily dispersible in the dye bath. However, dyeing assistants known in the art can be used to improve dyeing with the higher molecular weight dicarboximido substituted methine compounds.

A preferred group of the methine compounds containing the dicarboximido groups illustrated above have one of the following formulas II 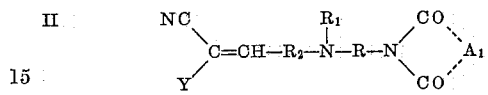

wherein $A_1$ represents the carbon atoms necessary to complete a monocyclic ring such as succinimido and substituted succinimido or III 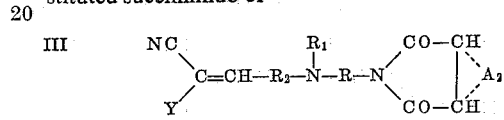

wherein $A_2$ represents the carbon atoms necessary to complete saturated or unsaturated monocyclic or polycyclic, fused-on carbocyclic rings such as in the phthalimido series; R, $R_1$, $R_2$ and Y having the above meanings.

The dicarboximidoalkylamino benzaldehydes used in the above reaction are obtained by formylation of the corresponding dicarboximidoalkylamino benzenes, for example, by reaction with dimethylformamide in the presence of phosphorous oxychloride as illustrated in Example 2A below.

The dicarboximidoalkylamino benzene starting materials are produced by condensation of dicarboxylic acid anhydrides with aminoalkylanilines, as illustrated in Example 1 below.

Representative dicarboximidoalkylamino benzenes whose syntheses are described in detail in U.S. patent application Ser. No. 232,239, filed Oct. 22, 1962, now U.S. Patent 3,161,631, and Ser. No. 236,135, filed Nov. 7, 1962, now U.S. Patent 3,148,178, are:

N-[2(N-ethyl-m-toluidine)ethyl]phthalimide
N-[2(N-ethylanilino)ethyl]succinimide
N-[2(N-ethyl-m-toluidine)ethyl]tetrachlorophthalimide
N-[2(N-butyl-m-toluidine)ethyl]succinimide
N-[2(N-ethyl-m-toluidine)ethyl]succinimide
N-[2(N-ethyl-m-toluidine)ethyl]bicyclo[2.2.1]-5-heptene-2,3-dicarboximide
N-[2(N-ethyl anilino)propyl]succinimide
N-[2(N-ethyl-m-toluidine)ethyl]cyclohexane-1,2-dicarboximide
N-[2(N-ethyl-m-toluidine)ethyl]citraconimide
N-β-glutarimidoethyl-N-ethyl-m-toludine
N-ethyl-N-succinimidomethylaniline
N-α-chloro-β-hydroxyproply-N-β-succinimidoethyl-m-toluidine
N-β-acetoxyethyl-N-β-succinimidothyl-m-toluidine
N-ethyl-N-phthalimidomethyl-m-toluidine
N-β-maleimidoethyl-N-ethyl-m-toluidine
N-β-3-aminophthalimidoethyl-N-ethyl-m-toluidine
N-[2(N-ethyl-m-toluidine)ethyl]-1,2,3,6-tetrahydrophthalimide
N-β-3-nitrophthalimidoethyl-N-ethyl-m-toluidine
N-[2(N-ethyl-m-toluidine)ethyl]cyclohexane-1,2-dicarboximide
N-β-cyanoethyl-N-β-succinimidoethyl-m-toluidine
N-2-hydroxyethyl-N-2-succinimidoethyl-m-toluidine
N-[2(N-o-toluidine)ethyl]succinimide
N-[2(N-m-toluidine)ethyl]succinimide
N-butyl-N-β-phthalimidoethylaniline
N-methyl-N-β-succinimido-m-chloroaniline
N-β-methoxyethyl-N-γ-succinimidopropylaniline Accordingly, representative dicarboximidoalkylamino benzaldehydes prepared as in Example 2 and which comprise one embodiment of our invention, are identical in structure to the compounds of the above list, except that each contains a —CHO group in the 4-position of the aniline radical of the compounds.

The methine compounds can be used for dyeing textile materials including synthetic polymer fibers, yarns and fabrics giving fast brilliant yellow shades when applied by conventional dyeing methods to polyester fibers. The methine compounds also have good affinity for cellulose ester and polyamide fibers. When the methine compounds are used for dyeing such hydrophobic materials, they should be free of water-solubilizing groups such as sulfo and carboxyl groups. In general, the dyes have good fastness, for example, to light, washing, gas (atmospheric fumes) and sublimation. Thus, the methine compounds in general can be expected to be superior to similar methine compounds when tested as textile dyes by methods such as described in the A.A.T.C.C. Technical Manual, 1964 edition, depending in part upon the particular dye used and the fiber being dyed.

The following examples will serve to illustrate the preparation of respresentative intermediates and methine compounds of our invention.

*Example 1.—Preparation of a dicarboximidoalkylamino benezene*

89 g. (0.5 m.) of N-β-aminoethyl-N-ethyl-m-toluidine and 74 g. (0.5 m.) of phthalic anhydride are mixed intimately and heated gradually until an exothermic reaction begins. The temperature rises to 120° C. without further heating. After the temperature begins to fall, heat is applied and held at 130140° C. for 1 hour. The partially cooled melt is drowned in 500 cc. of hot ethanol and allowed to cool. The product is filtered off, washed with a little alcohol, and dried at 60° C. The yield is 129 g. of material melting at 86–87° C. According to analysis this product N-[2(N-ethyl - m - toludine)ethyl]phthalimide has the structure:

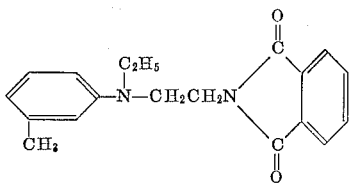

The other dicarboximidoalkylamino benzenes listed above are prepared similarly using the appropriate anhydrides and substituted anilines.

*Example 2.—Preparation of dicarboximidoalkylamino benzaldehydes*

A. 30.8 g. (0.1 m.) N-[2(N-ethyl-m-toluidine)ethyl] phthalimide above is dissolved in 30 ml. of dimethylformamide by heating to about 50° C. The solution is cooled, and 11 ml. of phosphorus oxychloride is added, keeping the temperature below 25° C. The reaction is then heated on the steam bath for 1 hour. It is drowned in 500 ml. water. The product comes down sticky but solidifies on standing. It is filtered off, washed with water, and recrystallized from 100 ml. of ethyl alcohol. Yield 30.7 g., M.P. 127–128.5° C.

The aldehydes of the following table, having the formula

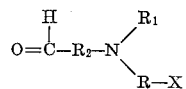

defined above, are made in the manner of Example 2A from the dicarboximidoalkylamino benzenes listed above.

| Example 2 | R | $R_1$ | Substituents on p-phenylene radical $R_2$ | X |
|---|---|---|---|---|
| B | $CH_2$-$CH_2$ | $C_2H_5$ | None | Succinimido. |
| C | $CH_2$-$CH_2$ | $C_2H_5$ | m-$CH_3$ | Do. |
| D | $CH_2$-$CH_2$ | $C_2H_5$ | m-$CH_3$ | Tetrahydrophthalimido. |
| E | $CH_2$-$CH_2$ | $C_2H_5$ | m-$CH_3$ | Hexahydrophthalimido. |
| F | $CH_2$-$CH_2$ | $C_2H_5$ | m-$CH_3$ | 4-carboxyphthalimido. |
| G | $CH_2$-$CH_2$ | $C_2H_5$ | m-$CH_3$ | 3-nitrophthalimido. |
| H | $CH_2$-$CH_2$ | $C_2H_5$ | m-$CH_3$ | 3-methylmaleimido. |
| I | $CH_2$-$CH_2$ | $C_2H_5$ | m-$CH_3$ | Maleimido. |
| J | $CH_2CH_2CH_2$ | $C_2H_5$ | m-$CH_3$ | Succinimido. |
| K | $CH_2\overset{CH_3}{\underset{|}{CH}}$-$CH_3$ | $C_2H_5$ | m-$CH_3$ | Do. |
| L | $CH_2CH_2$ | $C_2H_5$ | o-$CH_3$ | Do. |
| M | $CH_2CH_2$ | $C_2H_5$ | 2,5-dimethyl | Do. |
| N | $CH_2CH_2$ | $C_2H_5$ | m-$OCH_3$ | Do. |
| O | $CH_2CH_2$ | $C_2H_5$ | m-Cl | Do. |
| P | $CH_2CH_2$ | $CH_3$ | m-$CH_3$ | Do. |
| Q | $CH_2CH_2$ | $C_2H_5$ | m-$CH_3$ | Glutarimido. |

*Example 3.—Preparation of the dyes*

A. A mixture of 1.44 g. (0.005 m.) of the aldehyde 4 - (N-ethyl-N-β-succinimidoethyl)-2-methylbenzaldehyde of Example 2C made in the manner of Example 2A above, 0.33 g. (0.005 m.) malononitrile, 3 drops piperidine, 10 ml. ethyl alcohol are refluxed 1 hour, the reaction mixture cooled, filtered, the product washed with a little methanol and dried. Yield 1.1 g., M.P. 163–165° C. The dye is:

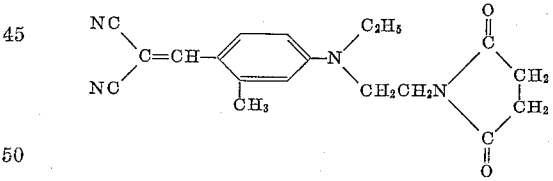

The dye colors polyesters, cellulose acetate and Verel mcdacrylic fiber in brilliant yellow shades with excellent fastness properties.

As will be apparent from the examples herein, the radicals R, $R_1$, $R_2$, X and Y may be varied widely to produce the methine compounds having good dyeing properties. The substituents of these radicals function primarily as auxochromes to control the color of the compounds. For example, the radical $R_2$, designated herein as a monocyclic arylene radical of the benzene series, may be phenylene unsubstituted or substituted in the ortho or meta positions relative to the methine group by the following radicals, which will ordinarily be present in the benzene nucleus of the initial anilines used in preparing the methine compounds: alkyl, especially lower alkyl; alkoxy, especially lower alkoxy and dialkoxy; halogen, e.g., bromine and iodine; carbalkoxy, e.g., —$COOCH_3$; hydroxyalkyl, e.g., hydroxyethyl; alkoxyalkyl, e.g., methoxyethyl; phenoxyalkyl, e.g., phenoxyethyl; alkylthio, e.g., ethylthio; phenylalkylthio, e.g., benzylthio; acetamido; carboxylic acid, acycloxy, e.g., acetoxy; carbamoyl, e.g., phenylcarbamoyl; acetoxyalkyl, e.g., β-acetoxyethyl; hydroxyl; nitro; alkylsulfonamido, e.g., methylsulfonamido; phenylalkoxy, e.g., benzyloxy; hydroxyalkoxy, e.g., β-hydroxyethoxy; haloalkoxy, e.g., β-chloroethoxy; phenoxyalkoxy, e.g., β-phenoxyethoxy; β-(β'-phenoxyalkoxy)alkoxy, e.g., β-(β'-phenoxyethoxy)ethoxy; carbalkoxyalkyl, e.g., —(CH$_2$)$_2$COOCH$_3$; carboxylic acid acylamidoalkyl, e.g., acetylaminoethyl; alkylcarbamoylalkyl, e.g., β-methylcarbamoylethyl; cyanoalkyl, e.g., β-cyanoethyl. However, radical R$_2$ should be free of substituents tending to interfere with the above condensation reaction by which the methine compounds are prepared, such as cyano, aliphatic acyl and alkylsulfonyl groups.

The dyes in the following table, having the general Formula I above are made using the procedure of Example 3A, substituting the appropriate aldehydes described in Example 2.

cyanoacetate. Polyesters are dyed in fast greenish-yellow shades by the product.

Example 10

Proceeding as in Example 3A, the malononitrile is replaced by 0.64 g. of isopropyl cyanoacetate. The product dyes hydrophobic fibers, such as polyester fibers in fast yellow shades.

Example 11

Proceding as in Example 3A, the aldehyde used is 1.68 g. of 4-(N-ethyl-N-β-phthalimidoethyl)-2-methylbenzaldehyde. The product (claim 4) dyes polyesters in fast yellow shades.

The methine compounds of the invention may be used for dyeing hydrophobic fibers such as linear polyester,

METHINE DYES (FORMULA I)

| Example 3 | R | R$_1$ | Substituents on p-phenylene group R$_2$ | X | Y |
|---|---|---|---|---|---|
| B | CH$_2$CH$_3$ | C$_2$H$_5$ | None | Succinimido | CN |
| C | CH$_2$CH$_3$ | C$_2$H$_5$ | m-CH$_3$ | do | CN |
| D | CH$_2$CH$_3$ | C$_2$H$_5$ | m-CH$_3$ | Tetrahydrophthalimido | CN |
| E | CH$_2$CH$_3$ | C$_2$H$_5$ | m-CH$_3$ | Hexahydrophthalimido | CN |
| F | CH$_2$CH$_3$ | C$_2$H$_5$ | m-CH$_3$ | 4-carboxyphthalimido | CN |
| G | CH$_2$CH$_3$ | C$_2$H$_5$ | m-CH$_3$ | 3-nitrophthalimido | CN |
| H | CH$_2$CH$_3$ | C$_2$H$_5$ | m-CH$_3$ | 3-methylmaleimido | CN |
| I | CH$_2$CH$_3$ | C$_2$H$_5$ | m-CH$_3$ | Maleimido | CN |
| J | CH$_2$CH$_2$CH$_3$ | C$_2$H$_5$ | m-CH$_3$ | Succinimido | CN |
| K | CH$_2$CHCH$_3$ (CH$_3$) | C$_2$H$_5$ | m-CH$_3$ | do | CN |
| L | CH$_2$CH$_3$ | C$_2$H$_5$ | o-CH$_3$ | do | CN |
| M | CH$_2$CH$_3$ | C$_2$H$_5$ | 2,5-dimethyl | do | CN |
| N | CH$_2$CH$_3$ | C$_2$H$_5$ | m-OCH$_3$ | do | CN |
| O | CH$_2$CH$_3$ | C$_2$H$_5$ | m-Cl | do | CN |
| P | CH$_2$CH$_3$ | CH$_3$ | m-CH$_3$ | do | CN |
| Q | CH$_2$CH$_3$ | C$_2$H$_5$ | m-CH$_3$ | do | CO$_2$CH$_2$CH(CH$_3$)$_2$ |
| R | CH$_2$CH$_3$ | C$_2$H$_5$ | m-CH$_3$ | do | CO$_2$CH$_3$ |
| S | CH$_2$CH$_3$ | C$_2$H$_5$ | m-CH$_3$ | do | CONH$_2$ |
| T | CH$_2$CH$_3$ | C$_2$H$_5$ | m-CH$_3$ | Glutarimido | CN |

The dyes of the above table dye polyester fibers in brilliant yellow shades with excellent fastness properties.

Example 4

The procedure of Example 3A is carried out except using as the aldehyde 1.51 g. of 4-(N-ethyl-N-γ-succinimidopropyl)-2-methylbenzaldehyde. The product (claim 1) imparts fast greenish-yellow shades to cellulose acetate, Dacron and Kodel polyester fibers.

Example 5

The procedure of Example 3A is carried out except using as the aldehyde 1.51 g. of 4-(N-ethyl-N-β-glutarimidoethyl)-2-methylbenzaldehyde. The product dyes polyesters in fast yellow shades.

Example 6

The procedure of Example 3A is carried out except using as the aldehyde 1.57 g. of 4-(N-β-cyanoethyl-N-β-succinimidoethyl)-2-methylbenzaldehyde. The product (claim 2) dyes polyesters in fast greenish-yellow shades.

Example 7

The procedure of Example 3A is carried out except using as the aldehyde 1.56 g. of 4-(N-butyl-N-β-succinimidoethyl)-2-methylbenzaldehyde. The product imparts fast greenish-yellow shades to Dacron and Kodel polyester fabrics.

Example 8

The procedure of Example 3A is carried out except using as the aldehyde 1.58 g. of 4-(N-β-methoxyethyl-N-β-succinimidoethyl)-2-methylbenzaldehyde. The product (claim 3) dyes polyesters in fast greenish-yellow shades.

Example 9

The process of Example 3A is carried out except that the malononitrile is replaced by 0.69 g. of β-cyanoethyl cellulose ester, acrylic, polyamide, etc., fibers in the manner described in U.S. Patents 2,880,050, 2,757,064, 2,782,187 and 3,043,827. The following example illustrates methods by which the methine compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of our invention have varying utility as dyes. The degree of utility varies, for example, depending upon the material being dyed and the formula of the methine compound. Thus, for example, all the dyes will not have the same degree of utility for the same material.

Cellulose esters which can be dyed with the methine compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new methine compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A compound having the formula

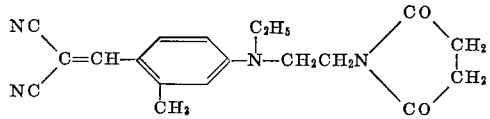

2. A compound having the formula

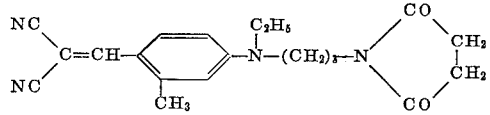

3. A compound having the formula

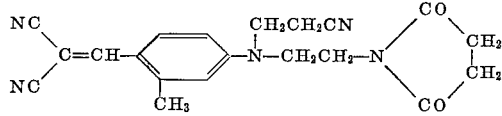

4. A compound having the formula

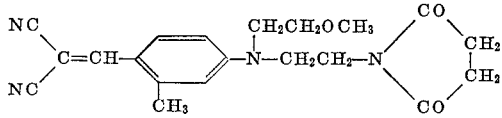

5. A compound having the formula

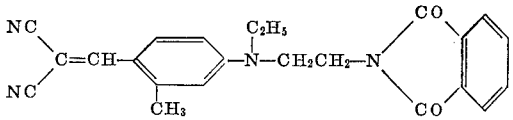

6. A methane compound having the formula

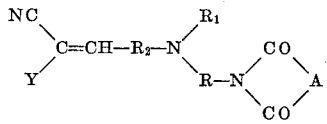

wherein
R=lower alkylene;
$R_1$=hydrogen, lower alkyl, lower hydroxyalkyl, lower cyanoalkyl, lower alkoxyalkyl, lower carboxylic acid acyloxyalkyl, lower carbalkoxyalkyl, lower haloalkyl, lower hydroxyhaloalkyl, lower alkylsulfonylalkyl, lower carbamoylalky, benzyl, lower phenoxyalkyl, lower cyanoalkyl, or lower alkylsulfonamidoalkyl;
$R_2$=phenylene or phenylene substituted with lower alkyl, lower hydroxyalkyl, lower acetoxyalkyl, lower carbalkoxyalkyl, lower carboxylic acid acylamidoalkyl, lower cyanoalkyl, lower alkoxyalkyl, lower phenoxyalkyl, lower alkoxy, lower hydroxyalkoxy, lower haloalkoxy, lower phenoxyalkoxy, halogen, hydroxyl, nitro, lower alkylthio, lower carbalkoxy, lower phenylalkylthio, acetamido, lower carboxylic acid acyloxy, carbamoyl, or lower alkylsulfonamido;
A=the carbon atoms necessary to complete a ring containing 4 or 5 carbon atoms in addition to the nitrogen atom; and
Y=cyano, carbamoyl, N-lower alkyl substituted carbamoyl, lower carbalkoxy or lower cyanocarbalkoxy; said compound being free of water soubilizing groups.

7. A methine compound having the formula

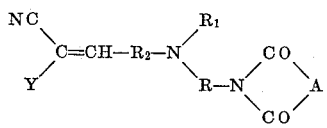

wherein
R=lower alkylene;
$R_1$=hydrogen, lower alkyl, lower hydroxyalkyl, lower cyanoalkyl, lower alkoxyalkyl, lower carboxylic acid acyloxyalkyl, lower carbalkoxyalkyl, lower haloalkyl, lower hydroxyhaloalkyl, lower alkylsulfonylalkyl, lower carbamoylalkyl, benzyl, lower phenoxyalkyl, lower cyanoalkyl, or lower alkylsulfonamidoalkyl;
$R_2$=phenylene or phenylene substituted with lower alkyl, lower hydroxyalkyl, lower acetoxyalkyl, lower carbalkoxyalkyl, lower carboxylic acid acylamidoalkyl, lower cyanoalkyl, lower alkoxyalkyl, lower phenoxyalkyl, lower alkoxy, lower hydroxyalkoxy, lower haloalkoxy, lower phenoxyalkoxy, halogen, hydroxyl, nitro, lower alkylthio, lower carbalkoxy, lower phenylalkylthio, acetamido, lower carboxylic acid acyloxy, carbamoyl, or lower alkylsulfonamido;
A=alkylene of 2 to 3 carbon atoms, alkylene of 2 to 3 carbon atoms substituted with lower alkyl, vinylene, vinylene substituted with lower alkyl, o-phenylene, o-phenylene substituted with lower alkyl, 1,2-cyclohexanediyl, 1,2-cyclohexanediyl substituted with lower alkyl, or bicyclo-[2.2.1]-5-heptene-2,3-diyl.
Y=cyano, carbamoyl, N-lower alkyl substituted carbamoyl, lower carbalkoxy or lower cyanocarbalkoxy; said compound being free of water solubilizing groups.

8. A methine compound as defined in claim 7 wherein $R_2$=phenylene or phenylene substituted with lower alkyl, lower hydroxyalkyl, lower acetoxyalkyl, lower carbalkoxyalkyl, lower carboxylic acid acylamidoalkyl, lower cyanoalkyl, lower alkoxy, lower hydroxyalkoxy, lower haloalkoxy or halogen.

9. A methine compound as defined in claim 8 wherein Y=cyano.

10. A methine compound as defined in claim 8 wherein Y=carbamoyl.

11. A methine compound as defined in claim 8 wherein Y=lower carbalkoxy.

12. A methine compound as defined in claim 8 wherein Y=lower cyanocarbalkoxy.

13. A methine compound as defined in claim 8 wherein
R is alkylene of up to 4 carbon atoms,
$R_1$ is lower alkyl,
$R_2$ is phenylene or phenylene substituted with lower alkyl, lower alkoxy or halogen,
A is o-phenylene or ethylene, and
Y is cyano.

14. A compound having the formula

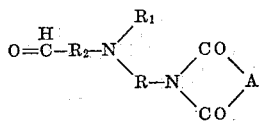

wherein
R = lower alkylene;
$R_1$ = hydrogen, lower alkyl, lower hydroxyalkyl, lower cyanoalkyl, lower alkoxyalkyl, lower carboxylic acid acyloxyalkyl, lower haloalkyl, lower hydroxyhaloalkyl, or lower carbamoylalkyl;
$R_2$ = phenylene or phenylene substituted with lower alkyl, lower alkoxy, or halogen; and
A = alkylene of 2 to 3 carbon atoms, alkylene of 2 to 3 carbon atoms substituted with lower alkyl, vinylene, vinylene substituted with lower alkyl, o-phenylene, o-phenylene substituted with lower alkyl, 1,2-cyclohexanediyl, 1,2-cyclohexanediyl substituted with lower alkyl, or bicyclo-[2.2.1]-5-heptene-2,3-diyl.

15. A compound as defined in claim 14 wherein
$R_1$ is lower alkyl and
A is ethylene.

16. A compound as defined in claim 14 wherein
$R_1$ is lower alkyl and
A is o-phenylene.

No references cited.

ALEX MAZEL, *Primary Examiner.*

MARY U. O'BRIEN, *Assistant Examiner.*